United States Patent [19]

Skinnell

[11] Patent Number: 4,611,726

[45] Date of Patent: Sep. 16, 1986

[54] UTILITY CONTAINER CONFIGURED FOR USE WITH AN OPEN-TOPPED VESSEL

[75] Inventor: John A. Skinnell, Lynchburg, Va.

[73] Assignees: Gordon Rudd, Roanoke; James C. Vaughan, Salem, both of Va.

[21] Appl. No.: 720,029

[22] Filed: Apr. 4, 1985

[51] Int. Cl.[4] ............................................. A01K 97/04
[52] U.S. Cl. ........................................ 220/408; 43/56
[58] Field of Search ............ 220/408, 409, 23, 23.83, 220/91, 92, 322, 22.1, 22.3; 43/56, 54.1

[56] References Cited

U.S. PATENT DOCUMENTS

| | | | |
|---|---|---|---|
| 1,541,799 | 6/1925 | Dodge | 220/408 |
| 1,587,785 | 6/1926 | Marsh et al. | 43/56 |
| 2,651,137 | 9/1953 | Sweet | 220/408 X |
| 2,870,932 | 1/1959 | Davis | 43/56 X |
| 2,879,916 | 3/1959 | Hoffmann et al. | 220/91 X |
| 3,378,134 | 4/1968 | Wilkinson et al. | 43/54.1 X |
| 3,656,650 | 4/1972 | Frater | 220/22.3 |
| 3,751,845 | 8/1973 | van Leeuwen | 43/56 |

Primary Examiner—Steven M. Pollard
Attorney, Agent, or Firm—Donald D. Mondul

[57] ABSTRACT

A utility container configured for use with an open-topped vessel, which container comprises a receptacle having an open top and a closed bottom and is configured to permit the receptacle to be received within the vessel. The container further has a depth-limiting structure for limiting the depth of travel of the receptacle within the vessel. Other features of the container include a lid for providing impermanent closure for the receptacle, partitions for establishing sections within the receptacle, adjustable partitions for defining sections within the receptacle according to a user's choice, and a handle-engagement structure for engaging the handle of a handled-vessel and locking the container with respect to the handled-vessel to form a unitary assembly.

5 Claims, 5 Drawing Figures

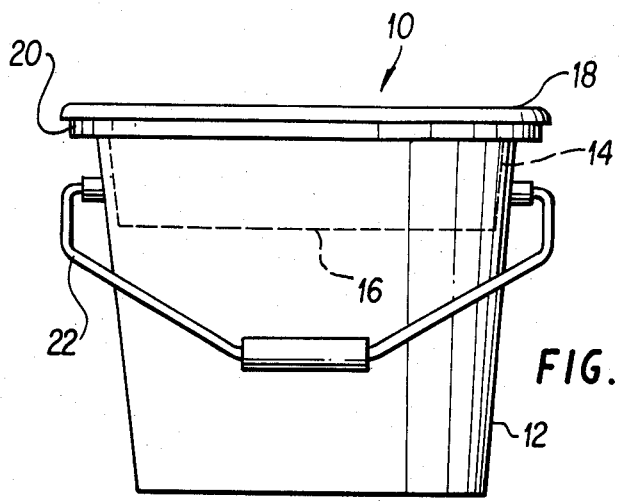
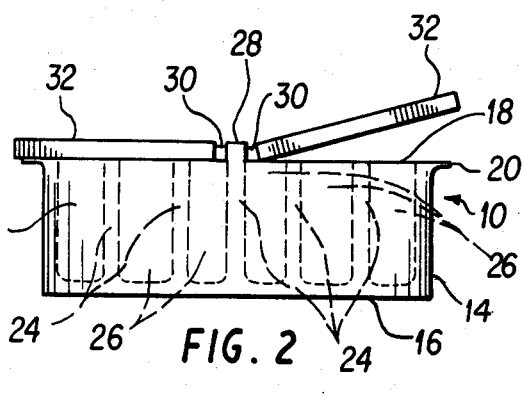
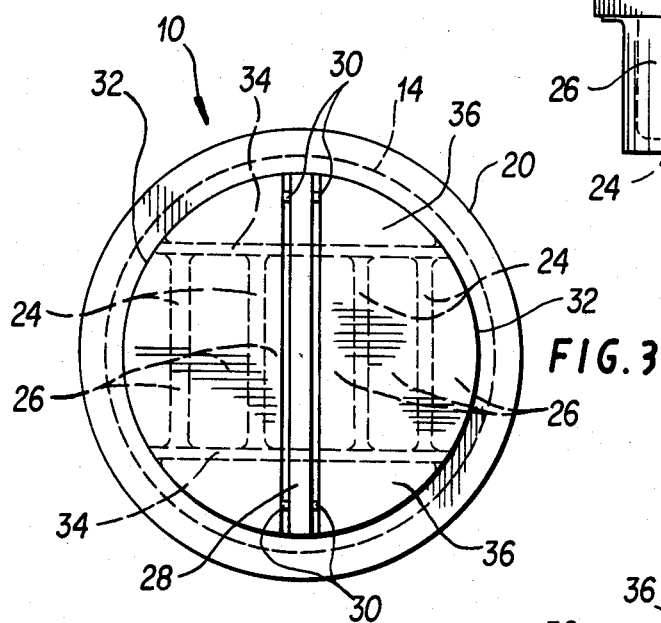
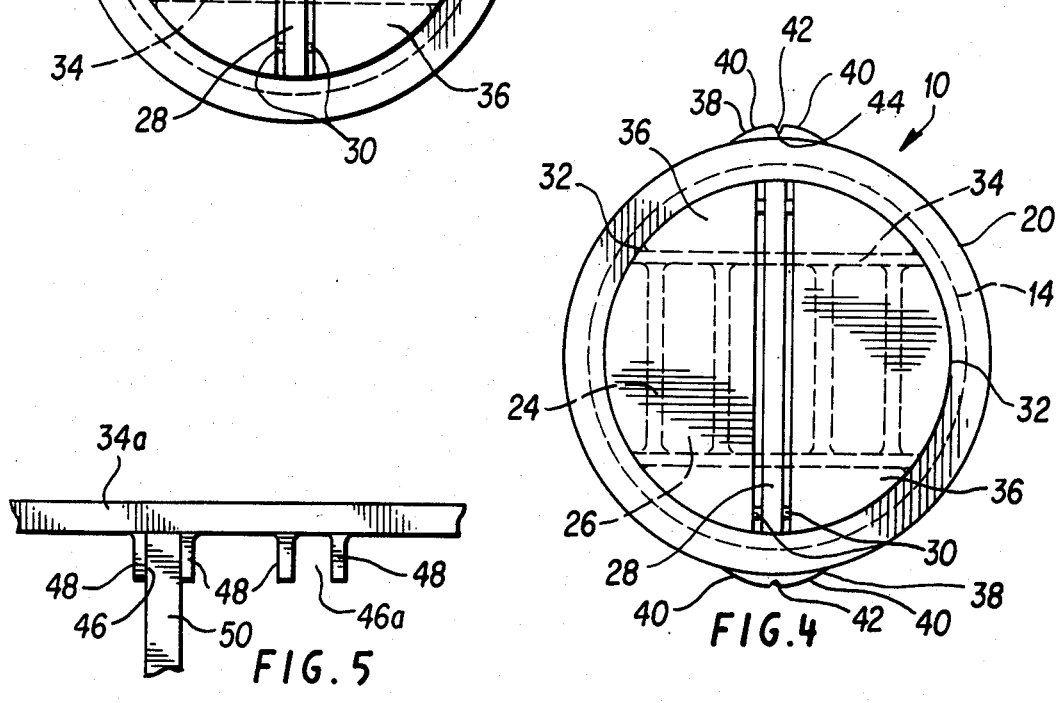
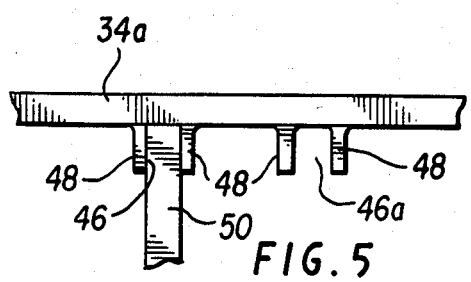

UTILITY CONTAINER CONFIGURED FOR USE WITH AN OPEN-TOPPED VESSEL

BACKGROUND OF THE INVENTION

The present invention is directed to a container for storage of utility items of various sorts: fishing tackle, tools, sewing equipment or other items.

In the area of fishing, by way of example, it is a common practice of fishermen to carry a bucket or similar container in order to transport bulky equipment, such as nets, stringer apparata, or the like, to the fishing site. The bucket or similar vessel is typically used at the fishing site to hold live bait or to hold the day's catch as it is accumulated, and the vessel is often subsequently used to transport the catch from the fishing site.

In addition to carrying such a vessel, the fisherman finds himself also frequently carrying such other paraphernalia as fishing rods, seating apparata, food containers, a tackle box, and other assorted things.

Thus, a fisherman can often be heavily laden in his trek to a fishing site; often more than one trip is required to comfortably establish oneself for a day of fishing.

The present invention is designed to ease some of the fisherman's burden by lessening the number of articles required to be carried to a fishing site, an improvement of the fisherman's lot which is especially valuable when the fishing site is remotely located from the point of departure of the fisherman from his transportation.

The present invention is equally valuable for other endeavors, such as those involving other items recited above, in consolidating the amount of equipment required for a task into fewer individual items requiring transportation.

SUMMARY OF THE INVENTION

The device is a utility container configured for use with an open-topped vessel, such as a bucket. The invention contemplates a container having a receptacle which is dimensioned to be received within the vessel. The invention incorporates a depth-limiting structure, such as a flange, to limit the depth to which the container is received within the vessel.

The preferred embodiment of the invention contemplates a lid arrangement for the receptacle portion of the container, which lid presents a flat surface at its top in order to facilitate sitting by a user or to present a convenient work surface to a user.

Another feature of the preferred embodiment of the invention is an engagement structure on the container, which engagement structure is intended to engage a handle of the vessel, such as the bail of a bucket, to lock the container and the vessel with respect to each other and thereby form a unitary assembly of the container and the vessel to facilitate carrying of the vessel and container in their assembled condition.

Still another feature of the the preferred embodiment of the invention is the provision of partitions within the receptacle of the container to form sections therein in order that the items stored therein may be easily organized and easily retrieved by a user.

In an alternate embodiment of the invention, the partitions are adjustable by a user in order that a user may define the sections he desires to have within the receptacle of the container.

It is therefore an object of the present invention to provide a utility container for storage of items, which container is configured to be received within an open-topped vessel and used therewith.

A further object of the present invention is to provide a utility container configured to be received within an open-topped vessel, which container has a lid, which lid may present a flat upper surface suitable for sitting or working.

Yet a further object of the present invention is to provide a utility container configured to be received within an open-topped vessel, which container is lockable in its position with respect to that vessel in order that the container and vessel may be carried as a unitary assembly.

Further objects and features of the present invention will be apparent from the following specification and claims when considered in connection with the accompanying drawings illustrating the preferred embodiment of the invention.

DETAILED DESCRIPTION OF THE DRAWINGS

FIG. 1 is a view of the preferred embodiment of the utility container of the present invention, illustrating its use with a representative vessel.

FIG. 2 is a front view of the preferred embodiment of the utility container of the present invention.

FIG. 3 is a top view of the preferred embodiment of the utility container of the present invention shown in FIG. 1.

FIG. 4 is a top view of an alternate embodiment of the utility container of the present invention.

FIG. 5 is a detail view of the structure for accommodating movable partition means according to one feature of the present invention.

DETAILED DESCRIPTION OF THE INVENTION

Referring to FIG. 1, a utility container 10 is illustrated in assembled relation with a vessel 12. The utility container 10 is composed of a receptacle 14 which is closed at its bottom 16 and open at its top 18. The receptacle 14 is received within the vessel 12 and the depth of reception of the receptacle 14 within the vessel 12 is limited by a flange 20 which depends substantially from the top of the receptacle 14.

Typically, the vessel 12 has a handle 22 to facilitate transport of the vessel 12.

FIG. 2 illustrates the preferred embodiment of the utility container 10 in front view.

In order to facilitate understanding the invention disclosed herein, like elements will be given like reference numbers throughout the various views of the drawings.

In FIG. 2, the utility container 10 is composed of a receptacle 14 and a flange 20 depending substantially from the top of the receptacle 14.

The receptacle 14 is closed at its bottom 16 and open at its top 18. Contained within the receptacle 14 are a plurality of partitions 24 which define a plurality of sections 26 in order that items stored within the receptacle 14 may be easily organized and easily retrieved by a user.

In the preferred embodiment of the invention illustrated in FIG. 2, a central partition 28 extends above the top 18 of the receptacle 14 and has attached thereto by hinges 30 two semi-circular flat lid structures 32. The lid structures 32 are rotatable about the hinges 30 to provide access to the interior of the receptacle 14 and, further, are rotatable to a position substantially abutting the top 18 of the receptacle 14 to provide impermanent closure for the receptacle 14.

Preferably the upper surfaces of the lids 32 and the central partition 28 are substantially co-planar when the lids 32 are in their closed position, substantially abutting the top 18 of the receptacle 14. In this manner, there is presented to a user a substantially flat surface suitable for seating or performance of work.

Referring to FIG. 3, a top view of the preferred embodiment of the invention as illustrated in FIG. 2 is presented. In FIG. 3 there is illustrated an arrangement of partitions 24 within the receptacle 14 wherein the partitions 24 are substantially aligned in one orientation and additional partitions 34, lying in an orientation different from the partitions 24, cooperate with the partitions 24 in establishing additional sections 36 within the receptacle 14.

The flange 20 is seen to extend outwardly from the receptacle 14 substantially uniformly about the circumference of the container 10 in order to insure limitation of the depth of reception of the receptacle 14 within a vessel 12, as shown in FIG. 1.

Referring to FIG. 4, an alternate embodiment of the utility container of the present invention is illustrated in top view. The utility container 10 of FIG. 4 is constructed similarly to the preferred embodiment illustrated in FIG. 3 in top view in that a flange 20 extends outwardly from a receptacle 14, partitions 24 and 34 establish sections 26 and 36 within the receptacle 14, and a central partition 28 extends upwardly from the receptacle 14 to support lid structures 32 by hinges 30.

The alternate embodiment of FIG. 4 additionally includes engagement structures 38 which are substantially integrally formed in the flange 20. The engagement structures 38 are configured to engage a handle, such as the handle 22 of the vessel 12 shown in FIG. 1, in order to lock the container 10 with respect to the vessel 12 to form a unitary assembly.

Accordingly, the engagement structures 38 have camming surfaces 40 and a notch 42. The notch 42 is dimensioned to captively receive the handle 22 therein. Thus, the handle 22, when raised to a position suitable for carrying the vessel 12 (when the container 10 is situated with its receptacle 14 received within the vessel 12), will bear upon the camming surfaces 40. The camming surfaces 40 will impart a spreading force upon the handle 22, thereby initiating a bias in the handle 22 to squeeze upon the container 10 through the engagement structures 38.

The notch 42 is configured so that its bottom-most extremity 44 lies outside of the at rest, unbiased position of the handle 22. Therefore, when the handle 22 is raised for carrying it rides over the camming surfaces 40 of the engagement structures 38 and encounters the notches 42, the bias imparted to the handle 22 by the camming surfaces 40 will cause the handle 22 to snap within the notches 42. However, since the bottom-most extremity 44 of the notches 42 remains outboard of the unbiased position of the handle 22, there will remain a bias in the handle 22 so that the handle 22 continues to squeeze the container 10 through the bottom-most extremities 44 of notches 42 of the engagement structures 38. In such manner the container 10 is locked in its position with respect to the vessel 12 and a unitary assembly composed of the vessel 12 and the container 10 is established.

FIG. 5 illustrates a detailed view of a structure for accommodating a movable partition arrangement to provide capability of user-defined sections within the receptacle 14 of the container 10. Thus, in FIG. 5, there is illustrated a partition 34a, which partition, when used within a receptacle 14 of a container 10 of the type disclosed herein, would be oriented within the receptacle 14 in a manner substantially similar to the orientation of partitions 34 of FIGS. 3 and 4.

Partition 34a has formed therein a plurality of slots 46, each of which slots is defined by a pair of walls 48. The walls 48 are preferrably formed integrally with the partition 34a by molding or by a similar method. A movable partition 50 is dimensioned to be slidingly received within the slot 46, between the walls 48 in substantially abutting relationship with the partition 34a. The opposite end of movable partition 50 is similarly slidingly engaged within a slot 46 between a pair of walls 48 and in similar abutting relationship with a second partition 34a (not shown). Thus, the movable partition 50 is temporarily captured in a fixed position between two partitions 34a and within two slots 46.

The movable partition 50 is easily relocated to a different position within the receptacle 14 by slidingly removing the movable partition 50 from within its pair of slots 46 to a different pair of slots 46a and slidingly inserting the movable partition 50 within the different slots 46a in similar abutting relationships with the two partitions 34a. In such a manner the movable partition 50 can be adjusted by a user so that the user may define sections 26 within the receptacle 14 according to his particular needs.

It is to be understood that, while the detailed drawings and specific examples given describe preferred embodiments of the invention, they are for the purpose of illustration only, that the method of the invention is not limited to the precise details and conditions disclosed and that various changes may be made therein without departing from the spirit of the invention which is defined by the following claims.

I claim:

1. A utility container configured for use with an open-topped vessel having a movable handle means for carrying said vessel; said container comprising a receptacle having a top and a bottom and a substantially planar flange depending outwardly from said receptacle above said bottom; said receptacle and said flange being configured approximately to permit said receptacle to be received within said vessel and said flange to engage said vessel to limit the depth of travel of said receptacle within said vessel; said flange further being configured to present an expanse in at least one axis greater than the reach of said handle means; said container further comprising engagement means for engaging said handle means and locking said container with respect to said vessel to form a unitary assembly; said engagement means comprising at least one concavity integrally formed substantially at the intersection of said at least one axis and the edge of said flange; whereby, when said container is received within said vessel in a position presenting said expanse to said handle means when said handle means is in a position appropriate for carrying said vessel and said handle compressively engages said flange, wherein said engagement means further comprises camming means adjacent each of said at least one concavity for cammingly guiding said handle means to said at least one concavity, said camming means being substantially coplanar with said flange.

2. A utility container as recited in claim 1 wherein said at least one axis is one axis and said at least one concavity is two concavities.

3. A utility container as recited in claim 2 wherein said engagement means further comprises camming means adjacent each of said two concavities for cammingly guiding said handle means to each of said two concavities.

4. A utility container as recited in claim 2 wherein said camming means comprise an integral ramp on each side of each of said two concavities, each of said ramps conforming to said flange at a distance from each of said two concavities and progressively increasing said expanse to a maximum substantially adjacent each of said two concavities.

5. A utility container as recited in claim 1 wherein said camming means comprise an integral ramp on each side of said at least one concavity, each of said ramps conforming to said flange at a distance from said at least one concavity and progressively increasing said expanse to a maximum substantially adjacent said at least one concavity.

* * * * *